S. E. WILSON.
LUNCH RECEPTACLE.
APPLICATION FILED MAY 24, 1910.
995,935.
Patented June 20, 1911.
2 SHEETS—SHEET 1.
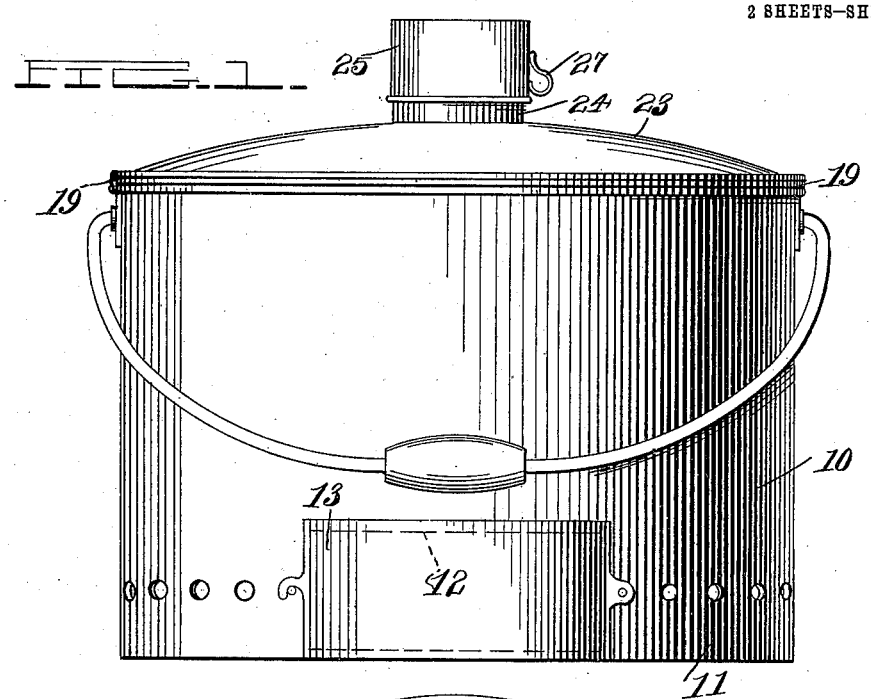
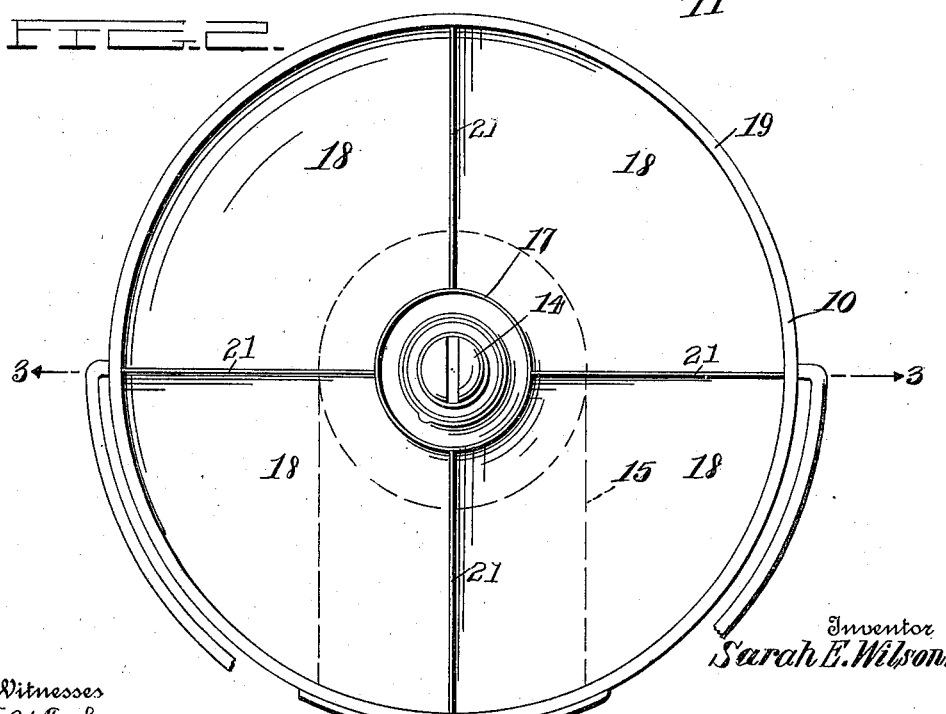
Witnesses
F. H. Taylor
C. N. Woodward
Inventor
Sarah E. Wilson.
By
Attorneys S. E. WILSON.
LUNCH RECEPTACLE.
APPLICATION FILED MAY 24, 1910.
995,935.
Patented June 20, 1911.
2 SHEETS—SHEET 2.
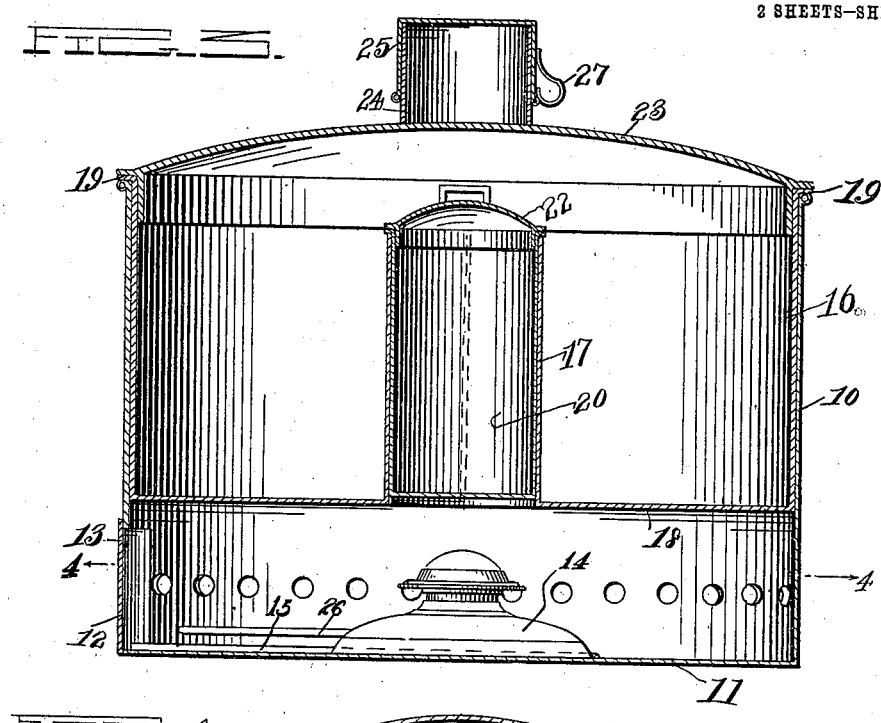
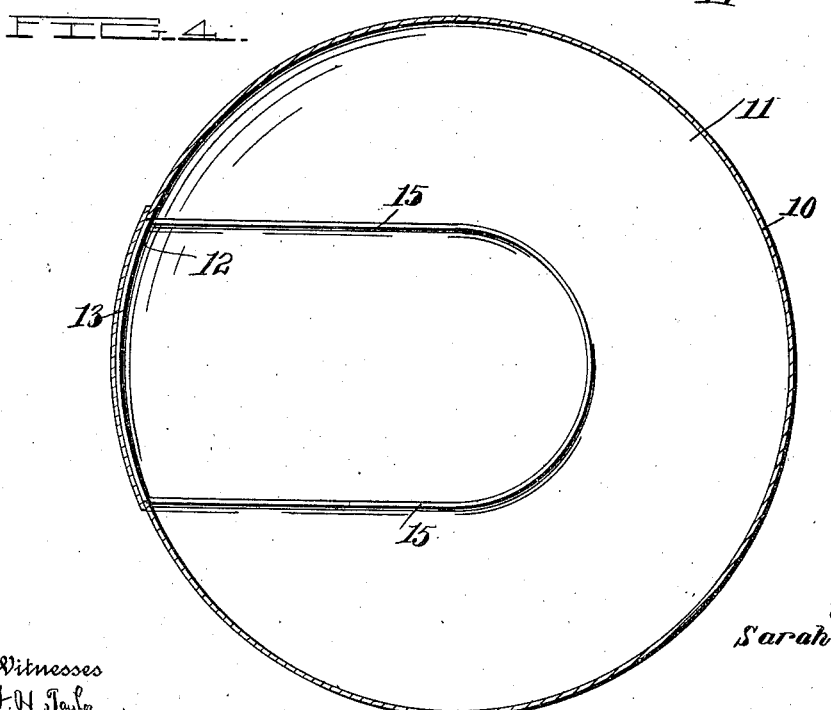
Witnesses
J. N. Taylor
C. N. Woodward
Inventor
Sarah E. Wilson
By
Chandler & Chandler
Attorneys

UNITED STATES PATENT OFFICE.

SARAH E. WILSON, OF PRENTISS, OKLAHOMA.

LUNCH-RECEPTACLE.

995,935.  Specification of Letters Patent.  Patented June 20, 1911.

Application filed May 24, 1910. Serial No. 563,192.

*To all whom it may concern:*

Be it known that I, SARAH E. WILSON, a citizen of the United States, residing at Prentiss, in the county of Beckham, State of Oklahoma, have invented certain new and useful Improvements in Lunch-Receptacles; and I do hereby declare the following to be a full, clear, and exact description of the invention, such as will enable others skilled in the art to which it appertains to make and use the same.

This invention relates to improvements in lunch receptacles, more particularly to the class wherein provision is made for heating the contents of the receptacle, and has for one of its objects to improve the construction and increase the efficiency and utility of devices of this character.

Another object of the invention is to provide a device of this character wherein the parts are arranged for separation for thorough cleansing.

Another object of the invention is to provide a device of this character wherein food of different kinds may be readily transported and maintained separately, and wherein a liquid receptacle is supported in position to receive the direct influence of the heat from the lamp.

Another object of the invention is to provide a device of this character wherein the liquid supporting vessel may be removed and the heating appliances utilized to impart heat to the compartments containing the solid foods.

With these and other objects in view, the invention consists in certain novel features of construction as hereinafter shown and described and then specifically pointed out in the claim; and, in the drawings illustrative of the preferred embodiment of the invention, Figure 1 is a side elevation of the improved device, Fig. 2 is a plan view with the covers detached, Fig. 3 is a section on the line 3—3 of Fig. 2, Fig. 4 is a section on the line 4—4 of Fig. 3.

The improved device comprises an outer shell or casing 10 having a closed bottom 11 and open at the top. The shell may be of any required size but will ordinarily be about nine inches in diameter and six inches in height, but it will be understood that the device is not necessarily limited to any particular size of the shell or other parts. The shell is formed with an opening 12 in one side and provided with a swinging closure 13, the aperture designed to permit a heating appliance such as a lamp 14 to be deposited within the shell upon the bottom 11. Arranged upon the bottom 11 are spaced guide ribs 15 to limit the movements of the lamp, and to secure its proper location when inserted, and to prevent the lamp from moving laterally when the shell and its attachments are being transported. The lamp is provided with a handle 26 extending from one side to enable the lamp to be more readily inserted and removed.

Suspended within the shell is a relatively large annular receptacle comprising an outer wall 16, an inner wall 17, and an annular bottom 18, the upper rim of the outer wall 16 being directed laterally as shown at 19 to form a flange for bearing upon the upper rim of the shell 10, and thus providing simple means for sustaining the receptacle in position. The wall 16 is formed to closely engage the inner face of the shell 10 with its bottom 18 spaced the requisite distance above the burner of the lamp 14, as shown. By this arrangement the inner wall 17 forms an open central space, and suspended within this space is a receptacle 20 for coffee or other liquids, the bottom of the receptacle 20 being disposed directly above the flame of the lamp, as shown.

Extending between the walls 16—17 of the receptacle are a plurality of division plates 21 which thus divide the annular receptacle into a plurality of separate compartments for the reception of foods of various kinds, while the inner wall 17 is supported by the partitions, as shown.

The inner receptacle 20 is provided with a detachable closure 22 while a larger closure 23 is arranged to bear upon the upper open end of the annular receptacle. The closure 23 is provided with another smaller receptacle 24 directed upwardly from its upper side, and fitting over the receptacle 24 is a cup 25 which forms a closure to the receptacle 24 and also serves as a drinking cup. The cup 25 is provided with a handle 27 to facilitate the handling of the same.

By this means it will be obvious that a simply constructed and convenient device is produced wherein a variety of different foods may be deposited in the compartments formed by the partitions 21 and separately inclosed therein, while coffee or other liquids may be carried in the inner receptacle 20. The bottom of the inner receptacle coming directly above the flame of the lamp 14, the contents of the vessel will be quickly heated, while the contents of the compartments formed by the partitions 21 will also be subjected to a certain degree of heat. The lamp 14 is preferably arranged for using alcohol or like smokeless fuel.

The improved device is simple in construction, can be manufactured of any suitable material and of any suitable size, and employed as a "dinner pail" by mechanics or other workmen, and will also be found useful as a means for conveying lunch upon picnics or other tours.

What is claimed is:—

A device of the class described comprising a shell open at the top and having a closed bottom and an opening through one side, an annular receptacle within the shell including a central open space and suspended within said shell with its bottom spaced above the bottom of the same, division plates connecting the inner and outer walls of said annular receptacle and bracing the same, an inner receptacle detachably supported within the central open space of the annular receptacle, a detachable closure for the inner receptacle, a detachable closure for the annular receptacle, and a lamp insertible through said opening of the shell and supported upon the bottom thereof.

In testimony whereof, I affix my signature, in presence of two witnesses.

SARAH E. WILSON.

Witnesses:
G. W. SANDERS,
M. J. SANDERS.

Copies of this patent may be obtained for five cents each, by addressing the "Commissioner of Patents, Washington, D. C."